(12) United States Patent
Cheng et al.

(10) Patent No.: US 11,824,447 B2
(45) Date of Patent: Nov. 21, 2023

(54) CONTROLLING BUCK-BOOST CONVERTERS BASED ON POWER SUPPLY IDENTIFICATION SIGNALS

(71) Applicant: Hewlett-Packard Development Company, L.P., Spring, TX (US)

(72) Inventors: Chao-Wen Cheng, Taipei (TW); Ying-Chi Chou, Taipei (TW); Feng Ming Lu, Taipei (TW); Chien Fa Huang, Taipei (TW); Chieh-Shen Huang, Taipei (TW); Tsung Yen Chen, Taipei (TW); Peter Seiler, Fort Collins, CO (US); Poying Chih, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 33 days.

(21) Appl. No.: 17/435,441

(22) PCT Filed: Jul. 23, 2019

(86) PCT No.: PCT/US2019/043079
§ 371 (c)(1),
(2) Date: Sep. 1, 2021

(87) PCT Pub. No.: WO2021/015746
PCT Pub. Date: Jan. 28, 2021

(65) Prior Publication Data
US 2022/0140732 A1 May 5, 2022

(51) Int. Cl.
*H02M 3/158* (2006.01)
*H02M 1/00* (2006.01)
*H02M 1/10* (2006.01)
*H02M 1/36* (2007.01)

(52) U.S. Cl.
CPC ....... *H02M 3/1582* (2013.01); *H02M 1/0009* (2021.05); *H02M 1/10* (2013.01); *H02M 1/36* (2013.01)

(58) Field of Classification Search
CPC . G06F 1/263; G06F 1/262; G06F 1/26; G06F 2211/1097; G06F 11/2015
See application file for complete search history.

(56) References Cited

U.S. PATENT DOCUMENTS

| | | | |
|---|---|---|---|
| 7,009,859 B2 | 3/2006 | Chen et al. |
| 7,276,886 B2 | 10/2007 | Kinder et al. |
| 7,709,976 B2 | 5/2010 | Bazinet |
| 8,009,404 B2 | 8/2011 | Blinder et al. |

(Continued)

FOREIGN PATENT DOCUMENTS

CN 103647434 A 3/2014

*Primary Examiner* — Gustavo A Rosario-Benitez
(74) *Attorney, Agent, or Firm* — Knobbe, Martens, Olson & Bear, LLP

(57) ABSTRACT

An example redundant power supply system comprises a power supply input to receive power from a power supply; a buck-boost converter coupled to the power supply input; and a controller coupled to the buck-boost converter. The controller is to receive a power supply identification signal from the power supply. The controller is also to enable or disable the buck-boost converter based on the power supply identification signal.

10 Claims, 4 Drawing Sheets

(56) References Cited

U.S. PATENT DOCUMENTS

| | | | |
|---|---|---|---|
| 8,078,893 B2* | 12/2011 | Umedu | G06F 1/325 |
| | | | 713/320 |
| 8,957,644 B2 | 2/2015 | Mao et al. | |
| 8,963,371 B2 | 2/2015 | Kinnard | |
| 9,350,243 B2 | 5/2016 | Chen et al. | |
| 9,774,185 B2 | 9/2017 | Bogdanik et al. | |
| 10,209,090 B2* | 2/2019 | Luke | B60L 50/64 |
| 10,790,739 B1* | 9/2020 | Villano | H02M 1/32 |
| 10,848,067 B2* | 11/2020 | Long | H02J 1/082 |
| 2009/0125156 A1* | 5/2009 | Killian | G06F 1/263 |
| | | | 700/297 |
| 2009/0244944 A1 | 10/2009 | Jang et al. | |
| 2010/0064150 A1* | 3/2010 | Higuchi | G06F 1/30 |
| | | | 713/300 |
| 2011/0010543 A1* | 1/2011 | Schmidt | H04W 12/06 |
| | | | 713/168 |
| 2012/0039102 A1* | 2/2012 | Shinoda | H02J 50/80 |
| | | | 363/123 |
| 2013/0030608 A1* | 1/2013 | Taylor | B60L 50/51 |
| | | | 701/2 |
| 2015/0048684 A1* | 2/2015 | Rooyakkers | H02J 9/00 |
| | | | 429/61 |
| 2015/0076209 A1 | 3/2015 | Shelton, IV et al. | |
| 2015/0236505 A1* | 8/2015 | Zhou | H02J 7/00 |
| | | | 307/52 |
| 2018/0309311 A1 | 10/2018 | Schaef et al. | |
| 2019/0145833 A1* | 5/2019 | Ryu | G01K 1/02 |
| | | | 340/870.17 |
| 2020/0006952 A1* | 1/2020 | Jang | H02J 1/102 |
| 2020/0163186 A1* | 5/2020 | Poojary | H02J 7/0068 |

* cited by examiner

CONTROLLING BUCK-BOOST CONVERTERS BASED ON POWER SUPPLY IDENTIFICATION SIGNALS

BACKGROUND

An electronic device, such as a computer, is powered by a power supply. In some cases, the electronic device performs a function such that the uninterrupted operation of the electronic device is desirable. Thus, additional power supplies may be used to power the electronic device, thereby providing power supply redundancy to the electronic device.

BRIEF DESCRIPTION OF THE DRAWINGS

Various examples will be described below referring to the following figures.

DETAILED DESCRIPTION

Figure 1:
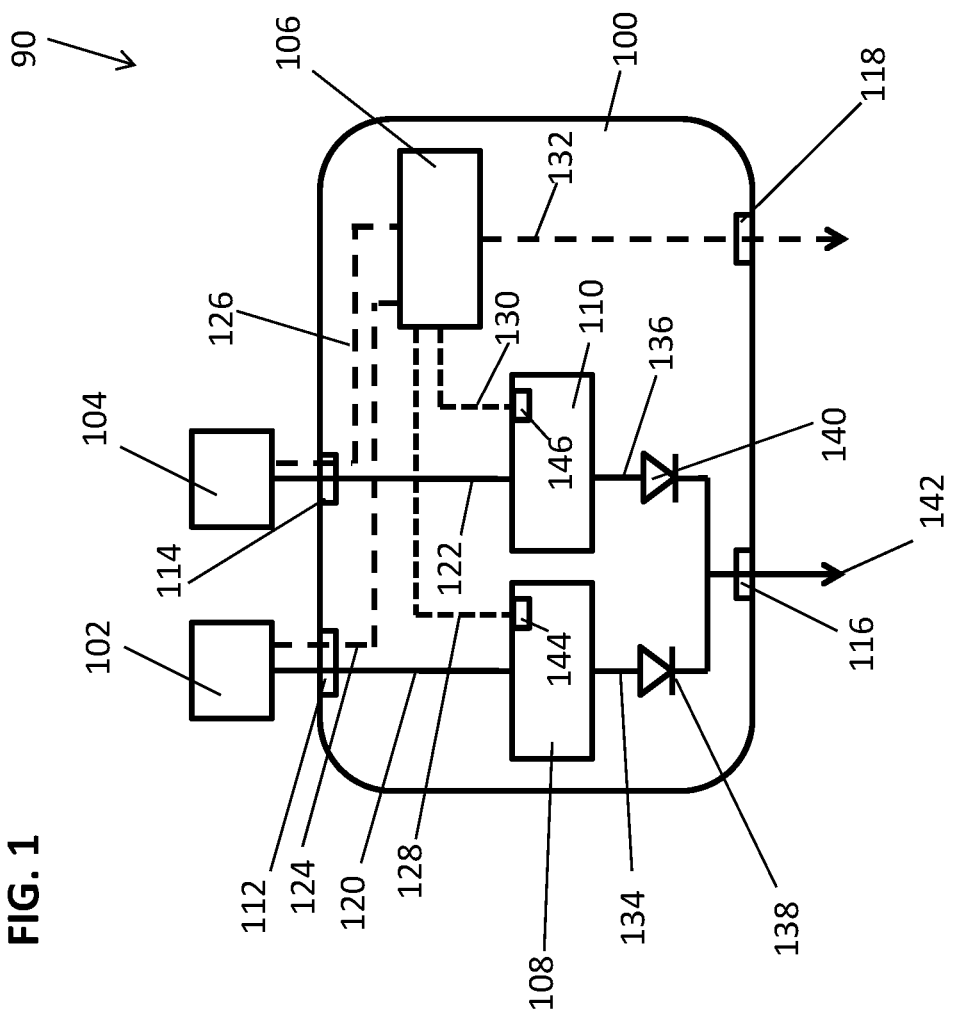
FIG. 1 is a block diagram of a redundant power supply system (RPSS) in accordance with various examples.

Certain challenges may arise in redundant power supply systems (RPSS) such as those described above. For example, in some cases, a power supply manufactured by an unknown third party may be installed in a redundant power supply system. The power capabilities of this power supply may be unknown, or the third party manufacturer may routinely produce power supplies of inferior quality and reliability. Likewise, for example, a power supply of inadequate power output capability may be "hot-plugged" (installed during active operation) in a redundant power supply system. Because many redundant power supply systems power electronic devices based on the lowest power level being provided to the system, a power supply of inadequate power output capability that is hot-plugged into the system may cause an immediate drop in power supplied to the electronic device. Example scenarios such as those described above are problematic because they may interrupt electronic device operations or may even permanently damage the electronic device.

This disclosure describes a novel RPSS. An example RPSS includes a pair of power supplies coupled to a power distribution device (PDD). The PDD includes a controller that is to receive a power supply identification signal (PS ID) from each power supply that is coupled to the PDD. The PDD also includes multiple buck boost converters, each buck boost converter coupled to a separate one of the power supplies. The controller couples to the buck boost converters and is to enable or disable each buck boost converter based on the PS ID received from the power supply corresponding to that buck boost converter.

During the time period until boot up of the RPSS is complete, in response to the receipt of a PS ID indicating that the power supply providing that PS ID is from a third party manufacturer, the controller is to disable the buck boost converter corresponding to that power supply. During the same period, in response to the receipt of a PS ID indicating that the power supply providing that PS ID is from a trusted manufacturer, the controller is to enable the buck boost converter corresponding to that power supply. (Buck boost converters are used so that a range of power supply voltages may be received and converted to a consistent target output voltage—e.g., a range of 18V to 28V may be increased or decreased to produce an output of 19.5V.)

During the time period after boot up of the RPSS is complete, in response to the receipt of a PS ID indicating that a power supply made by a trusted manufacturer and with adequate output power has been hot-plugged into the RPSS, the controller is to enable the buck boost converter corresponding to that power supply. In response to the receipt of a PS ID indicating that a power supply from an unknown or untrusted manufacturer or providing an inadequate amount of output power has been hot-plugged into the RPSS, the controller is to disable the buck boost converter corresponding to that power supply.

In this way, third party power supplies or power supplies supplying inadequate power are prevented from possibly damaging the electronic device being powered.

FIG. 1 is a block diagram of a redundant power supply system (RPSS) 90 in accordance with various examples. The RPSS 90 may be used to supply redundant power to any of a variety of electronic devices, such as personal computers, laptops, tablets, workstations, servers, smartphones, wearable devices, etc. In examples, the RPSS 90 includes a power supply 102 and a power supply 104. The scope of disclosure is not limited to the use of any particular number of power supplies. Additional power supplies may be implemented. The power supplies 102, 104 may be capable of providing the same amounts of power or different amounts of power. For example, the power supplies 102, 104 may each be capable of providing 230 W of power. In another example, the power supply 102 may be capable of providing 230 W of power while the power supply 104 is capable of providing 115 W of power. In some examples, the power supply 102 is capable of providing more power than the power supply 104, while in other examples, the power supply 104 is capable of providing more power than the power supply 102.

The RPSS 90 further includes a PDD 100 coupled to the power supplies 102, 104 via power supply inputs 112, 114, respectively. The PDD 100 comprises a controller 106, a buck-boost converter 108, and a buck-boost converter 110. In examples, the number of buck-boost converters corresponds to the number of power supplies. Thus, buck-boost converter 108 corresponds to power supply 102, buck-boost converter 110 corresponds to power supply 104, and if additional power supplies were included, additional, corresponding buck-boost converters would also be included. The buck-boost converter 108 couples to the power supply 102 via a connection 120, which passes through the power supply input 112. Likewise, the buck-boost converter 110 couples to the power supply 104 via a connection 122, which passes through the power supply input 114.

The controller 106, described in greater detail below with respect to FIG. 2, couples to the power supply 102 via a connection 124 that passes through the power supply input 112. In some examples, a separate input of the PDD 100 may be used to route the connection 124 between the controller 106 and the power supply 102. The connection 124 provides a power supply identification signal (PS ID) from the power supply 102 to the controller 106, and thus the connection 124 may more specifically be called a PS ID connection 124. The PS ID may be programmed into the power supply 102 during manufacture or at any other suitable time. The PS ID may comprise an analog or digital signal that conveys information regarding the power supply 102 to the controller 106. Such information may include, for example, a manufacturer of the power supply 102 (or, likewise, an indication that the power supply 102 is or is not manufactured by a trusted manufacturer), a power output capability of the power supply 102, and any other suitable information pertaining to the power supply 102. In some examples, the PS ID may be transmitted wirelessly, for example, using Bluetooth, radio frequency identification (RFID), or near-field communication (NFC) technology. Executable code on the controller 106 causes the controller 106 to perform some or all of the functions attributed herein to the controller 106, including the receipt and interpretation of the PS ID and reaction to the PS ID as described in detail below.

The controller 106 couples to the power supply 104 via a PS ID connection 126 that passes through the power supply input 114. In some examples, a separate input of the PDD 100 may be used to route the PS ID connection 126 between the controller 106 and the power supply 104. The PS ID connection 126 provides a power supply identification signal (PS ID) from the power supply 104 to the controller 106. The PS ID may be programmed into the power supply 104 during manufacture or at any other suitable time. The PS ID may comprise an analog or digital signal that conveys information regarding the power supply 104 to the controller 106. Such information may include, for example, a manufacturer of the power supply 104 (or, likewise, an indication that the power supply 104 is or is not manufactured by a trusted manufacturer), a power output capability of the power supply 104, and any other suitable information pertaining to the power supply 104. In some examples, the PS ID may be transmitted wirelessly, for example, using Bluetooth technology. Executable code on the controller 106 causes the controller 106 to perform some or all of the functions attributed herein to the controller 106, including the receipt and interpretation of the PS ID and reaction to the PS ID as described in detail below.

The buck-boost converters 108, 110 may be designed to increase or decrease any suitable input voltage to any suitable output voltage. In some examples, input voltages may range from 18 V to 28 V, inclusive, although the scope of disclosure is not limited as such. In some examples, the output voltage may be 19.5 V, although the scope of disclosure is not limited to any particular output voltage. As described above, any suitable number of buck-boost converters may be included such that each power supply couples to a corresponding buck-boost converter.

The controller 106 couples to the buck-boost converter 108 via a connection 128. The connection 128 is received at the buck-boost converter 108 at an enable input 144. The connection 128 carries a signal from the controller 106 that enables or disables the buck-boost converter 108. For example, in response to receiving a particular PS ID, the controller 106 may enable or disable the buck-boost converter 108. Likewise, the controller 106 couples to the buck-boost converter 110 via a connection 130. The connection 130 is received at the buck-boost converter 110 at an enable input 146. The connection 130 carries a signal from the controller 106 that enables or disables the buck-boost converter 110. For instance, in response to receiving a particular PS ID, the controller 106 may enable or disable the buck-boost converter 110. The buck-boost converters 108, 110 may operate independently of each other, such that while one is enabled, the other is disabled. In some examples, both may be simultaneously enabled or disabled.

The PDD 100 further includes current control components 138, 140, such as diodes, that are coupled to the buck-boost converters 108, 110, respectively, via connections 134, 136, respectively, and that are also coupled to a power output 116. In particular, the cathodes of the current control components 138, 140 may couple to each other and to the power output 116. A connection 142 outputs power from the PDD 100 via the power output 116.

The PDD 100 also includes a PS ID output 118. The controller 106 couples to the PS ID output 118 via a PS ID connection 132. The controller 106 can output one of the PS IDs received via the PS ID connections 124, 126 on the PS ID connection 132. An illustrative manner in which the controller 106 selects the PS ID to be output on the PS ID connection 132 is described below.

Figure 2:
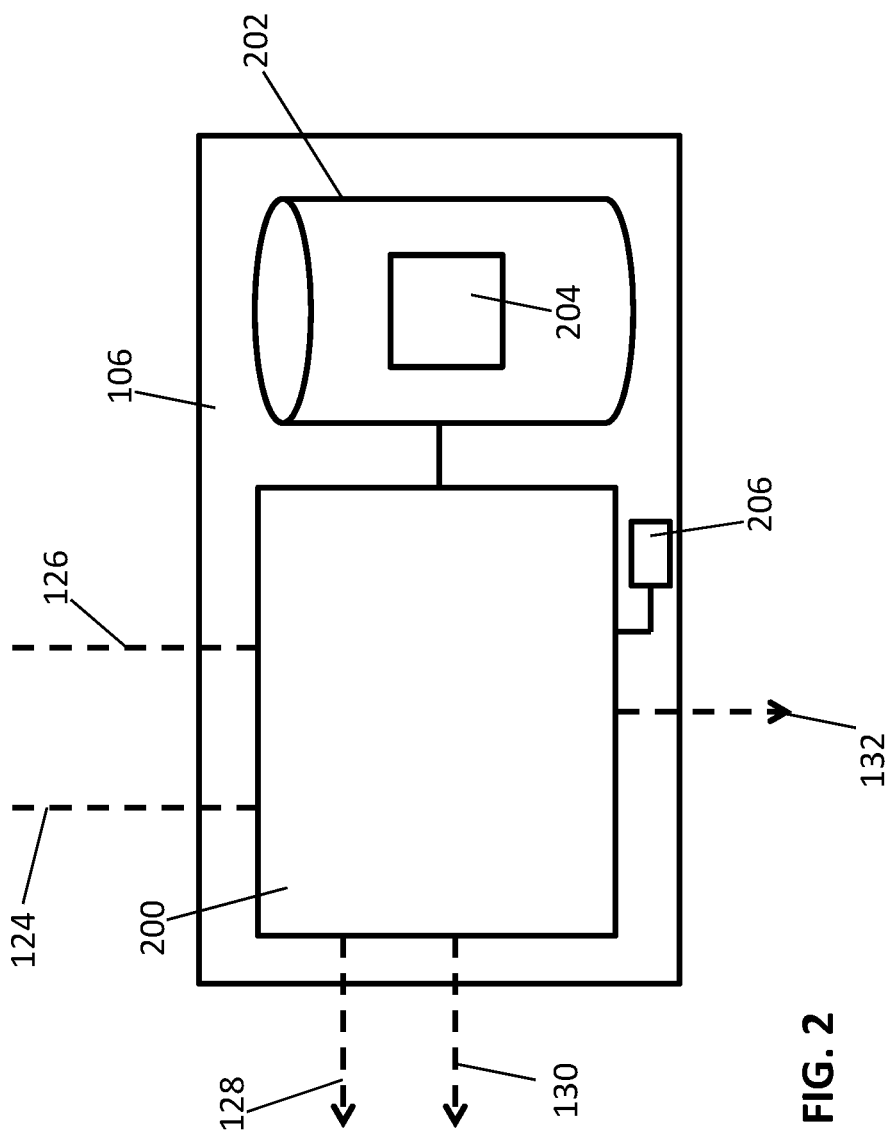
FIG. 2 is a block diagram of a controller within a power distribution device (PDD) of an RPSS, in accordance with various examples.
Figure 3:
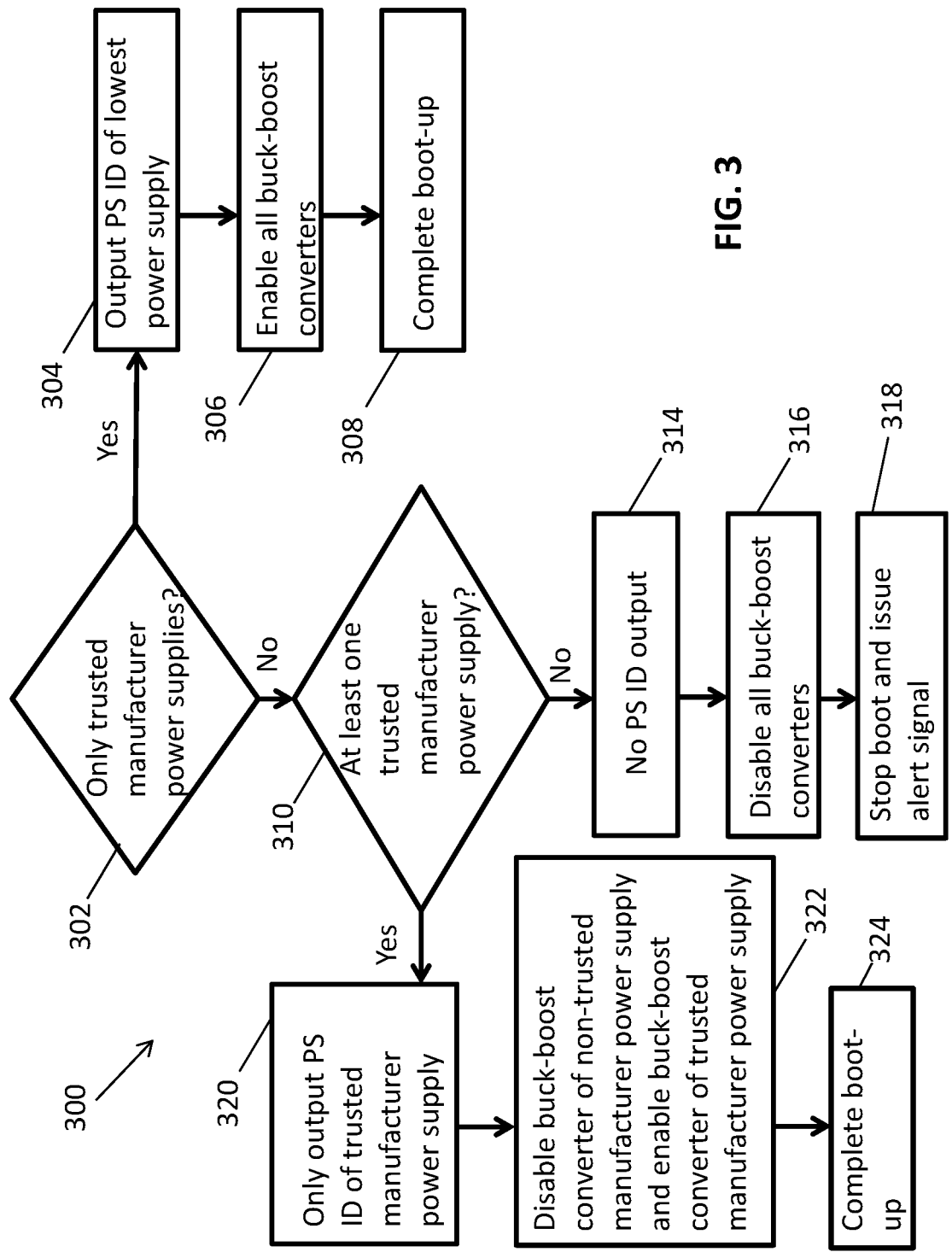
FIG. 3 is a flow diagram of a pre-boot method of operation for a PDD controller, in accordance with various examples.
Figure 4:
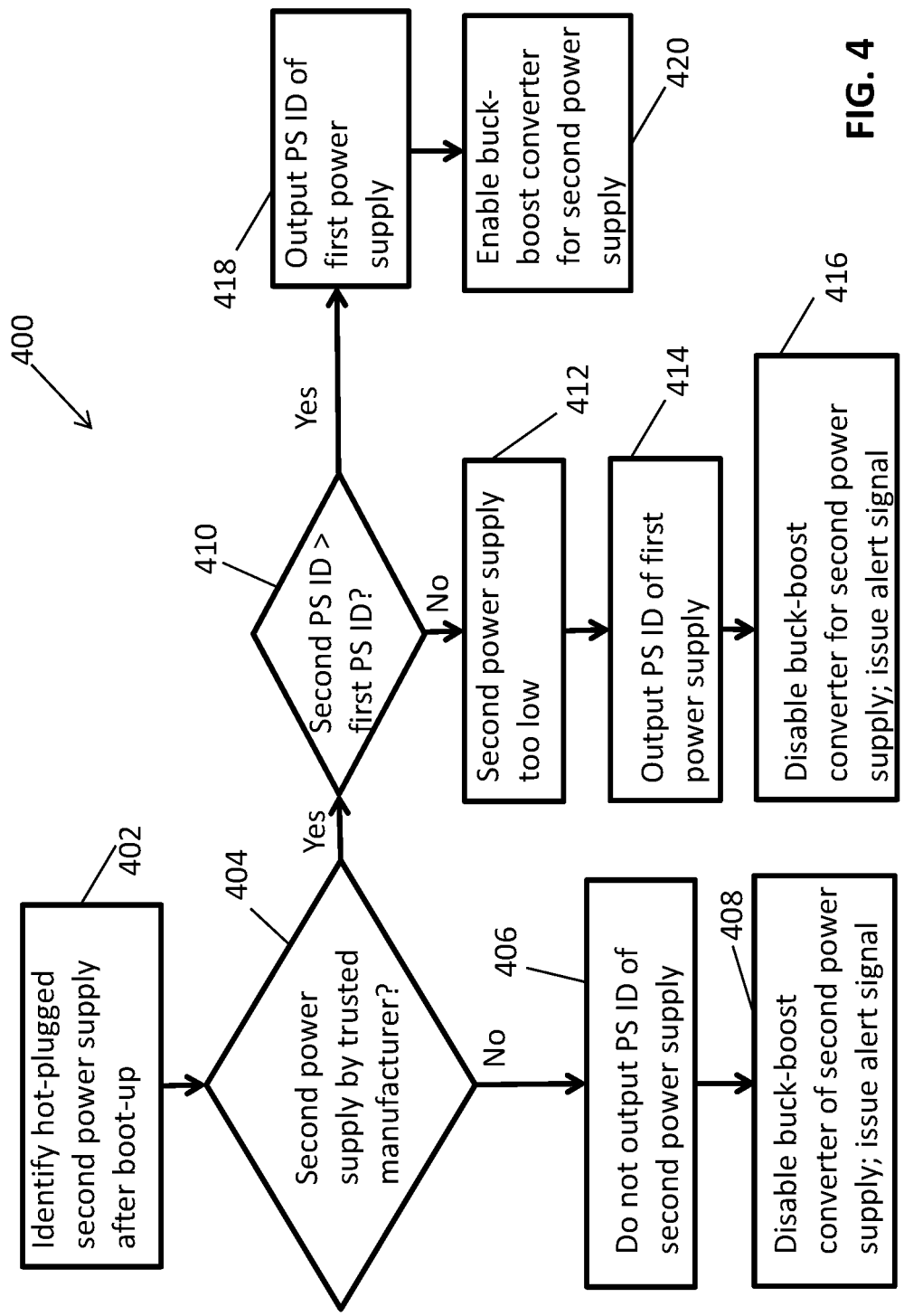
FIG. 4 is a flow diagram of a post-boot method of operation for a PDD controller, in accordance with various examples.

Example contents of the controller 106 are now described with respect to FIG. 2, followed by a description of the operation of the RPSS 90 in tandem with the method flowcharts of FIGS. 3 and 4.

FIG. 2 is a block diagram of the controller 106, in accordance with various examples. The controller 106 includes a processor 200 coupled to a memory (or "storage") 202 storing executable code 204. The executable code 204 comprises software, firmware, or a combination thereof. The processor 200 also couples to an alert indicator 206, such as a light-emitting diode (LED), exposed to an exterior of the RPSS 90 such that the alert indicator 206 is visible from outside of the RPSS 90. In some cases, the alert indicator 206 is a computer display that displays an alert indication on a graphical user interface (GUI). In some cases, the alert indicator 206 is a speaker that creates an audible alarm for a user to hear.

The memory 202 comprises a computer-readable medium storing the executable code 204, which, when executed by the processor 200, causes the processor 200 to perform some or all of the actions attributed herein to the controller 106. The processor 200 also couples to the PS ID connections 124, 126, by which the processor 200 receives PS IDs from the power supplies 102, 104, respectively. The processor 200 further couples to the connections 128, 130, by which the processor 200 outputs control signals to the enable inputs 144, 146, respectively. The processor 200 still further couples to the PS ID connection 132, by which the processor 200 outputs a PS ID selected from the PS IDs received via PS ID connections 124, 126.

An example operation of the RPSS 90 is now described with simultaneous reference to FIGS. 1-4. In the methods of FIGS. 3 and 4, which are now described in turn, the controller 106 compares received PS IDs to criteria (e.g., predetermined criteria), such as trusted power supply manufacturer criteria and power threshold criteria specifying a minimum output power draw (whether in the form of a specific power level or a comparison to output power capabilities of other power supplies). Based on such comparisons, the controller 106 makes determinations regarding the power supplies and enables or disables the buck-boost converters corresponding to those power supplies. The controller 106 likewise determines which PS ID to output on the PS ID connection 132 based on such comparisons. These aspects are now described with reference to FIGS. 1-4 and with particular reference to FIGS. 3 and 4.

FIG. 3 is a flow diagram of a pre-boot method of operation 300 for the controller 106, in accordance with various examples. The method 300 describes the actions of the controller 106 in response to the receipt of PS IDs during the time period before boot-up of the RPSS 90 is complete. The method 300 begins with the controller 106 using the PS IDs to determine whether both PS IDs indicate that the corresponding power supplies 102, 104 are manufactured by trusted manufacturers (302). For example, as explained above, the PS IDs may contain a certain feature(s), such as a particular state of a particular bit(s) in a digital code, that indicates that the corresponding power supply is made by a trusted manufacturer. If the PS ID lacks this feature(s), the controller 106 may determine that the corresponding power supply is not made by a trusted manufacturer. If the controller 106 determines at (304) that both PS IDs indicate trusted manufacturer status for both power supplies 102, 104, then the controller 106 outputs the PS ID corresponding to the power supply with the lowest output power capability (304). (The PS ID of the power supply with the lowest output power capability is provided on the PS ID connection 132 because the electronic device to be powered by the RPSS 90 may use information regarding the minimum output power capability of the RPSS 90 in case one of the power supplies fails.) For example, if the PS ID from the power supply 102 indicates that the power supply 102 has an output power capability of 230 W and the PS ID from the power supply 104 indicates that the power supply 104 has an output power capability of 115 W, the controller 106 may output the PS ID of the power supply 104 via PS ID connection 132. The power capability of a power supply 102, 104 may be encoded in the PS ID provided by that power supply 102, 104.

As mentioned above, in some examples, the PS ID is an analog signal. In this case, the signal may be selected to be in a narrow, specific, predetermined range, and when the controller 106 determines that the analog signal is in this range, the controller 106 recognizes the PS ID as having been provided by a power supply having trusted manufacturer status. In addition, within the range, a higher analog signal may indicate a higher output power capability, and a lower analog signal may indicate a lower output power capability. Likewise, as mentioned above, in some examples, the PS ID is a digital signal. In this case, the PS ID may comprise any suitable number of bits that are arranged and encoded in accordance with a predetermined scheme such that certain bits indicate trusted manufacturer status for the corresponding power supply (as described above) and such that certain bits indicate the output power capability of the corresponding power supply.

The method 300 continues with the controller 106 enabling all (e.g., both) buck-boost converters 108, 110. By enabling the buck-boost converters 108, 110, the power supplied by the corresponding power supplies 102, 104 is provided to the current control components 138, 140 and to the power output 116. The RPSS 90 then completes boot-up (308).

If the outcome of (302) is negative, the method 300 comprises the controller 106 determining whether one of the power supplies 102, 104 is made by a trusted manufacturer (310). If so, the method 300 comprises the controller 106 outputting the PS ID of the power supply by the trusted manufacturer via the PS ID connection 132 (320). The method 300 then comprises disabling the buck-boost converter corresponding to the non-trusted power supply and enabling the buck-boost converter corresponding to the trusted power supply (322). In this way, the power supplied by the trusted manufacturer power supply is output by the RPSS 90, but the power supplied by the untrusted manufacturer power supply is blocked. This may be beneficial in case the untrusted manufacturer has a reputation for providing poor-quality products which may fail in their role as redundant power supplies, which may cause operating troubles or even damage to the electronic device being powered, etc. The method 300 then comprises completing boot-up (324).

If the outcome of (310) is negative, the method 300 comprises the controller 106 not outputting any PS IDs on the connection 132 (314), disabling both of the buck-boost converters 108, 110 (316), and stopping the boot-up process and issuing an alert signal (318). For example, an alert signal may be issued using the alert indicator 206, which may draw the attention of technical personnel.

FIG. 3 describes the actions of the controller 106 before boot-up is complete. FIG. 4 is a flow diagram of a post-boot method of operation 400 for the controller 106, in accordance with various examples. In particular, the method 400 describes the actions of the controller 106 in response to a hot-plugged power supply post-boot up. The method 400 assumes that, prior to performance of the method 400, just the power supply 102 is coupled to the PDD 100. The method 400 begins with the controller 106 identifying that a second power supply (e.g., power supply 104) has been hot-plugged into the PDD 100 after boot-up (402). The controller 106 uses the PS ID from the hot-plugged power supply 104 to determine whether the power supply 104 is made by a trusted manufacturer (404). If not, the PS ID of the power supply 104 is not output on the PS ID connection 132 (406), and the buck-boost converter 110 is likewise disabled and an alert signal is issued (408). Conversely, if the power supply 104 is by a trusted manufacturer (404), the method 400 comprises determining whether the PS ID of the power supply 104 indicates a greater output power capability than the PS ID of the power supply 102 (410). For example, in the case of analog PS IDs, a higher voltage level may indicate a greater output power capability than a lower voltage level. If the power supply 104 has a greater output power capability than the power supply 102, this means that the PDD 100 has been hot-plugged with a power supply having a suitable minimum power level, and that, as explained, is made by a trusted manufacturer. Thus, the method 400 comprises the controller 106 outputting the PS ID of the power supply 102 (418) and enabling the buck-boost converter 110 (420) (in addition to the buck-boost converter 108, which is already enabled). In this way, the hot-plugged power supply 104 becomes a fully-participating redundant power supply in the RPSS 90.

If the outcome at (410) is negative, the output power capability of the power supply 104 is too low (412), and so the PS ID of the power supply 102 is output on the PS ID connection 132 (414). Furthermore, the buck-boost converter 110 is disabled and an alert signal is issued (416).

Using the foregoing techniques, the RPSS 90 is able to identify power supplies by unknown or untrusted manufacturers and/or with inadequate output power capabilities, and to prevent such power supplies from operating in a redundant power system that needs dependable power supplies for proper, reliable operation.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A redundant power supply system, comprising:
   a power supply input to receive power from a power supply;
   a buck-boost converter coupled to the power supply input; and a controller coupled to the buck-boost converter, the controller to:
  receive a power supply identification signal from the power supply; and
  enable or disable the buck-boost converter based on the power supply identification signal,
wherein the power is prevented from being supplied to a load in response to the controller disabling the buck-boost converter based on the power supply identification signal received from the power supply,
wherein the controller is to enable and disable the buck-boost converter based on a comparison of the power supply identification signal to a criteria, and
wherein, during a boot-up process of the redundant power supply system, the controller is to enable the buck-boost converter in response to the comparison indicating that the power supply is manufactured by a trusted manufacturer.

2. The redundant power supply system of claim 1, comprising a current control component coupled to the buck-boost converter.

3. The redundant power supply system of claim 2, wherein the current control component comprises a diode.

4. The redundant power supply system of claim 1, wherein, during the boot-up process of the redundant power supply system, the controller is to disable the buck-boost converter in response to the comparison indicating that the power supply is not manufactured by the trusted manufacturer.

5. The redundant power supply system of claim 1, wherein, after the boot-up process of the redundant power supply system, the controller is to enable the buck-boost converter in response to the comparison indicating that the power supply is manufactured by the trusted manufacturer and that power supplied by the power supply meets a power threshold.

6. The redundant power supply system of claim 1, wherein, after the boot-up process of the redundant power supply system, the controller is to disable the buck-boost converter in response to the comparison indicating that the power supply is not manufactured by the trusted manufacturer, that the power supplied by the power supply fails to meet a power threshold, or both.

7. A redundant power supply system, comprising:
  a first power supply input to receive a first power supply identification signal and a first power from a first power supply;
  a first buck-boost converter coupled to the first power supply input;
  a first current control component coupled to the first buck-boost converter;
  a second power supply input to receive a second power supply identification signal and a second power from a second power supply;
  a second buck-boost converter coupled to the second power supply input;
  a second current control component coupled to the second buck-boost converter; and
  a controller coupled to the first power supply input and the second power supply input, and the controller to disable the first buck-boost converter based on the first power supply identification signal and to disable the second buck-boost converter based on the second power supply identification signal,
wherein the first power is prevented from being supplied to a load in response to the controller disabling the first buck-boost converter based on the first power supply identification signal received from the first power supply, and wherein the second power is prevented from being supplied to the load in response to the controller disabling the second buck-boost converter based on the second power supply identification signal received from the second power supply,
wherein the controller is to enable and disable the first and second buck-boost converters based on a comparison of first and second power supply identification signals to a criteria, and
wherein the criteria specifies a trusted manufacturer and a power threshold.

8. The redundant power supply system of claim 7, wherein the first and second current control components include diodes.

9. A non-transitory computer-readable medium storing executable code comprising computer-executable instructions which, when executed by a controller, causes the controller to:
  receive power and a power supply identification signal from a power supply to provide the power to a redundant power supply system;
  compare the power supply identification signal to a criteria, the criteria specifying a trusted manufacturer and a power threshold; and
  based on the comparison, disable a buck-boost converter coupled to the power supply to prevent the power from being supplied to a load, wherein, during a boot-up process of the redundant power supply system, the controller is to:
    enable the buck-boost converter in response to the comparison indicating that the power supply is manufactured by the trusted manufacturer; and
    disable the buck-boost converter in response to the comparison indicating that the power supply is not manufactured by the trusted manufacturer.

10. The non-transitory computer-readable medium of claim 9, wherein, after the boot-up process of the redundant power supply system, the controller is to:
  enable the buck-boost converter in response to the comparison indicating that the power supply is manufactured by the trusted manufacturer and that power supplied by the power supply meets the power threshold; and
  disable the buck-boost converter in response to comparison indicating that the power supply is not manufactured by the trusted manufacturer, that the power supplied by the power supply fails to meet the power threshold, or both.

* * * * *